(12) United States Patent
Whitaker (10) Patent No.: US 10,315,533 B2
(45) Date of Patent: Jun. 11, 2019

(54) SEAT TILT CONTROL MECHANISM

(71) Applicant: CVG Management Corporation, New Albany, OH (US)

(72) Inventor: Robert J. Whitaker, Venore, TN (US)

(*) Notice: Subject to any disclaimer, the term of this patent is extended or adjusted under 35 U.S.C. 154(b) by 0 days.

(21) Appl. No.: 15/950,794

(22) Filed: Apr. 11, 2018

(65) Prior Publication Data
US 2018/0229627 A1    Aug. 16, 2018

Related U.S. Application Data

(63) Continuation of application No. 15/301,196, filed as application No. PCT/US2015/022544 on Mar. 25, 2015, now abandoned.

(60) Provisional application No. 61/970,140, filed on Mar. 25, 2014.

(51) Int. Cl.
B60N 2/12 (2006.01)
B60N 2/10 (2006.01)
B60N 2/16 (2006.01)

(52) U.S. Cl.
CPC ............ B60N 2/10 (2013.01); B60N 2/1635 (2013.01); B60N 2/1695 (2013.01)

(58) Field of Classification Search
CPC ....... B60N 2/10; B60N 2/1635; B60N 2/1695
USPC .......................... 297/344.15, 344.16, 344.17
See application file for complete search history.

(56) References Cited

U.S. PATENT DOCUMENTS

| 3,216,766 | A | 11/1965 | Tabor |
| 5,358,308 | A | 10/1994 | Judic et al. |
| 6,488,337 | B1 | 12/2002 | De Voss et al. |
| 7,066,540 | B2 | 6/2006 | Minai et al. |
| 7,703,851 | B2 | 4/2010 | Nakaya et al. |
| 7,770,863 | B2 | 8/2010 | Yamada et al. |
| 8,496,098 | B1 | 7/2013 | Napau et al. |
| 8,590,971 | B2 | 11/2013 | Ito et al. |
| 8,690,114 | B2 | 4/2014 | Boyarski et al. |
| 9,027,993 | B2 | 5/2015 | Munemura et al. |
| 9,630,527 | B2 | 4/2017 | Matsui |
| 2004/0135412 | A1 | 7/2004 | Suck et al. |
| 2006/0041359 | A1 | 2/2006 | Ohtsubo et al. |
| 2007/0227854 | A1 | 10/2007 | Cabrit et al. |
| 2009/0230730 | A1* | 9/2009 | Ohtsubo ............ B60N 2/0232 296/193.07 |
| 2009/0267397 | A1 | 10/2009 | Kubota |
| 2010/0237216 | A1 | 9/2010 | Napau et al. |
| 2013/0270410 | A1 | 10/2013 | Boyarski |
| 2015/0306983 | A1 | 10/2015 | Takei et al. |

(Continued)

FOREIGN PATENT DOCUMENTS

GB    1238146    7/1971

OTHER PUBLICATIONS

Extended European Search Report for European Patent Application No. EP 15 76 8496 dated Oct. 18, 2017, 7 pages.

(Continued)

*Primary Examiner* — Rodney B White
(74) *Attorney, Agent, or Firm* — Walter Haverfield LLP; James J. Pingor (57) ABSTRACT

A vehicle seat assembly is provided and includes a base assembly, a seat frame assembly attached to the base assembly, and a seat tilt control mechanism attached to the base assembly and the seat frame assembly. Actuation of the tilt drive assembly adjusts a tilt position of the seat frame assembly with respect to the base assembly.

19 Claims, 11 Drawing Sheets

(56) References Cited

U.S. PATENT DOCUMENTS

| | | |
|---|---|---|
| 2015/0336477 A1 | 11/2015 | Matsui |
| 2016/0114703 A1* | 4/2016 | Fujita .................. B60N 2/0232 297/344.1 |
| 2017/0120778 A1 | 5/2017 | Suzuki |
| 2017/0334314 A1* | 11/2017 | Takada ................ B60N 2/0232 |
| 2018/0079326 A1* | 3/2018 | Hayashi .............. B60N 2/0232 |
| 2018/0111510 A1* | 4/2018 | Takada ................... F16H 35/18 |
| 2018/0194250 A1* | 7/2018 | Arakawa ............. B60N 2/1635 |

OTHER PUBLICATIONS

Written Opinion of the International Searching Authority for International Patent Application No. PCT/US15/22544 dated Jul. 1, 2015, 5 pages.

International Search Report for International Patent Application No. PCT/US15/22544 dated Jul. 1, 2015, 2 pages.

International Preliminary Report on Patentability for International Patent Application No. PCT/US2015/022544 dated Sep. 27, 2016, 6 pages.

* cited by examiner

SEAT TILT CONTROL MECHANISM

CROSS-REFERENCE TO RELATED APPLICATIONS

This application is a continuation of U.S. patent application Ser. No. 15/301,196, entitled "SEAT TILT CONTROL MECHANISM" filed Sep. 30, 2016, which is a National Stage application of and claims the benefit of PCT/US15/22544 entitled "SEAT TILT CONTROL MECHANISM" filed Mar. 25, 2015, which claims the benefit of U.S. Provisional Patent Application Ser. No. 61/970,140 entitled "SEAT TILT CONTROL MECHANISM" filed on Mar. 25, 2014. The entirety of each of the above-noted applications is herein incorporated by reference.

ORIGIN

The innovation disclosed herein relates to vehicles and more specifically, to a mechanism that controls forward and rearward tilting of a seat assembly.

BACKGROUND

Conventional seats within long haul trucks and other similar vehicles include many safety and comfort features that enhance an operator's driving experience. For example, a means to adjust (pivot) a seat assembly in a forward and rearward direction is often incorporated into the seat assembly to enhance the comfort of the seat for the occupant. Current seat tilt devices include a latch that latches to a latching mechanism. When the latch is released from the latching mechanism via a handle, lever, etc., the latch is disengaged from the latching mechanism and the seat assembly freely pivots in a forward and rearward direction in an uncontrolled movement. In other words, the seat assembly is now disengaged moves forward and backward freely similar to that of a rocking chair. Thus, the movement of the seat assembly is uncontrolled and difficult to adjust.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation a seat tilt control mechanism is provided that controls the tilt of the entire seat assembly. The tilt of the seat assembly is achieved about a pivot point that coincides with a seat track attachment point. The pivot itself is achieved via rubber mounts. The seat tilt control mechanism operates on a sprag type clutch concept. More specifically, rollers wedge into an outer diameter of a drive frame and lock into position. The wedged rollers are disengaged via a pin allowing seat adjustment of the seat assembly. This configuration allows infinite adjustment within range, positive locking holds adjusted position.

In another aspect of the innovation, a vehicle seat assembly is disclosed that, includes a base assembly, a seat frame assembly attached to the base assembly, and a seat tilt control mechanism attached to the base assembly and the seat frame assembly, wherein actuation of the tilt drive assembly adjusts a tilt position of the seat frame assembly with respect to the base assembly.

In still yet another aspect of the innovation, a seat tilt control mechanism for a vehicle is disclosed that includes a tilt drive assembly attached to a seat frame assembly, a tilt pivot assembly attached to a base assembly and the seat frame assembly, and a drive link connecting the tilt drive assembly to the tilt pivot assembly, wherein actuation of the tilt drive assembly adjusts a tilt position of the seat frame assembly with respect to the base assembly.

In another aspect of the innovation, a method of adjusting a seat assembly is disclosed that includes providing tilt seat control mechanism in a neutral position, actuating a lever in direction associated with adjusting a height of a seat frame assembly with respect to a base assembly, unseating one of a pair of wedge rollers corresponding to the actuation direction of the lever, freeing up the drive disc, rotating both an output plate and the drive disc in a direction associated with the actuation direction of the lever, and adjusting the height of the seat frame assembly with respect to the base assembly.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

The innovation disclosed herein provides a mechanism that provides a controlled pivoting movement of a seat assembly in a forward and rearward direction in accordance with an aspect of the innovation. The innovative mechanism operates in a similar fashion as the sprag type clutch.

Figure 1:
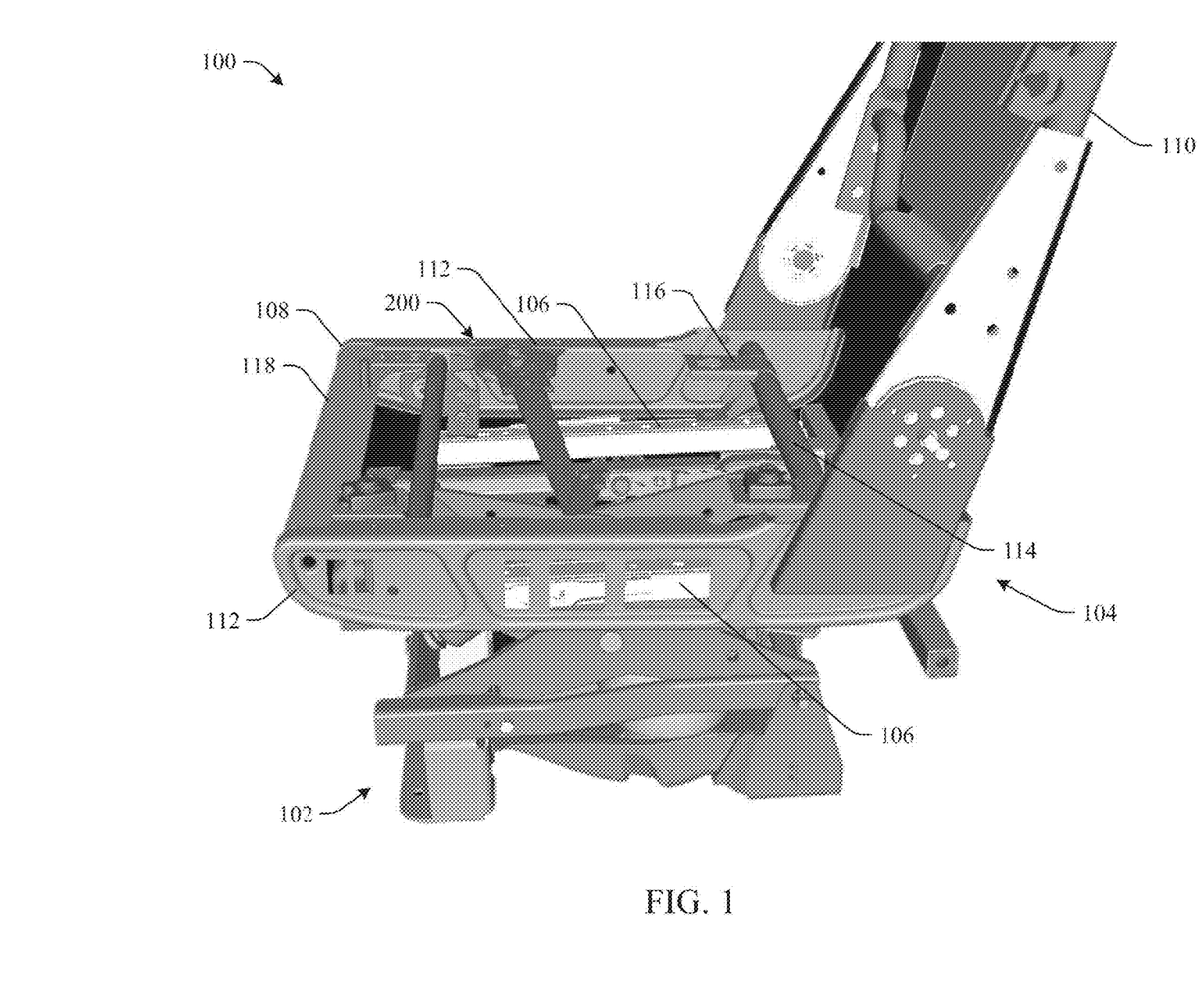
FIG. 1 is a side perspective view of a seat assembly for a vehicle incorporating an innovative seat tilt control mechanism in accordance with an aspect of the innovation.

Referring now to the figures, FIG. 1 is a side perspective view of a seat assembly 100 for a vehicle incorporating an innovative seat tilt control mechanism 200 in accordance with an aspect of the innovation. The seat assembly 100 includes a base assembly 102 and a seat frame assembly 104. The base assembly 102 attaches to an interior floor surface of the vehicle. The seat assembly 100 is moveable in a sliding fashion in a forward and rearward direction with respect to the floor surface of the vehicle. In one aspect, the base assembly 102 may be slidable with respect to the floor surface. In another aspect, the base assembly 102 may be fixed to the floor surface and the seat frame assembly 104 may be slidable with respect to the base assembly 102.

The seat assembly 100 may also be moveable in an upward and downward direction. In one aspect, the base assembly 102 may include a scissor type mechanism that allows the seat assembly to move in an upward and downward direction with respect to the floor surface. The base assembly 102 may further include a pair of side rails 106, one each disposed on each upper side of the base assembly 102. The side rails 106 receive the seat frame assembly 104 as will be described further below.

Figure 2:
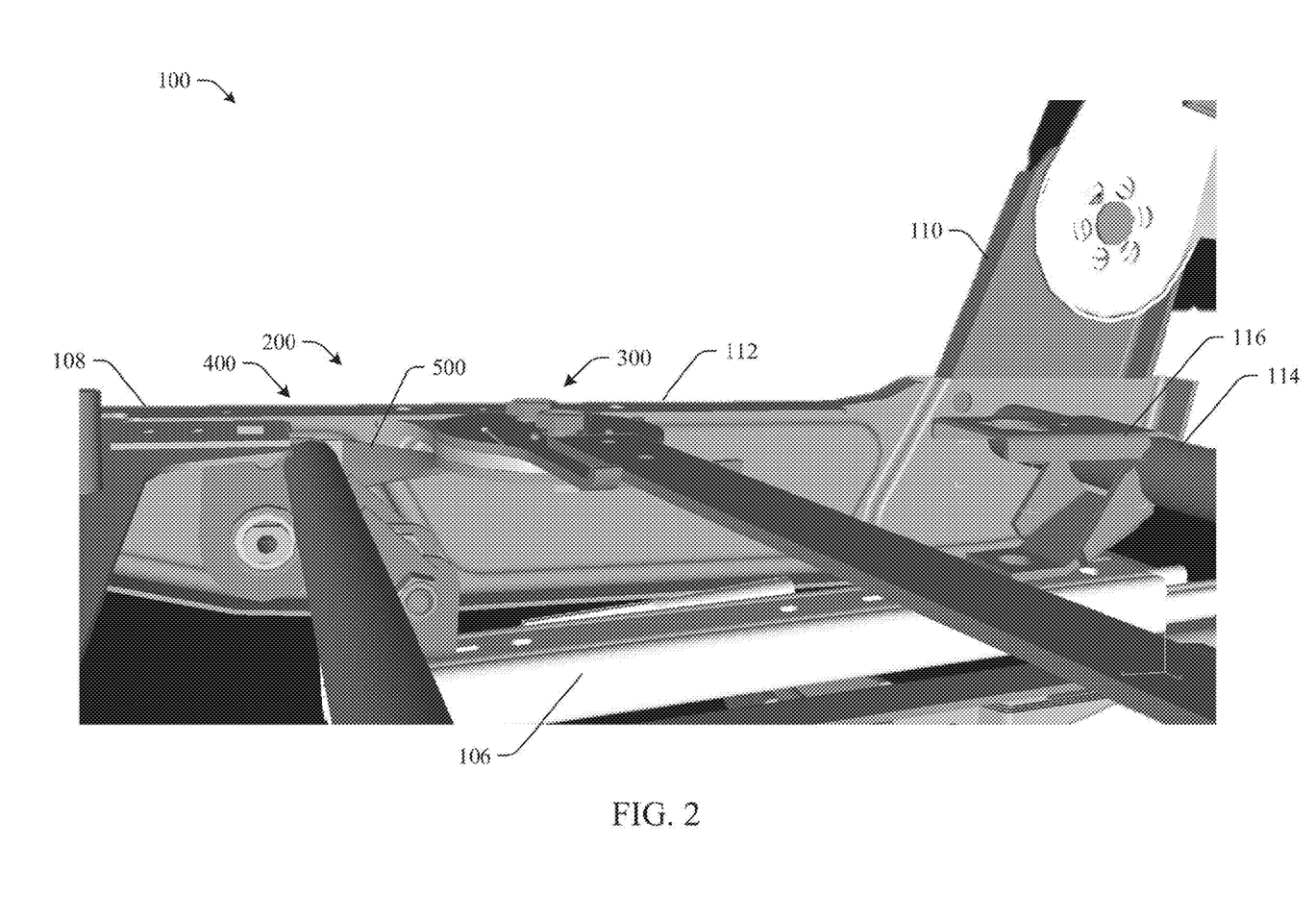
FIG. 2 is a side perspective view illustrating attachment of the seat tilt control mechanism to the seat assembly in accordance with the innovation.

Referring to FIGS. 1 and 2, the seat frame assembly 104 attaches to a top portion of the base assembly 102 and includes a lower support portion 108 and an upper support portion 110. The lower support portion 108 includes a pair of side frame members 112 and a rear cross bar 114 attached to each side rail 106 with brackets 116.

The seat frame assembly 102 further includes the innovative seat tilt control mechanism 200 that includes a tilt drive assembly 300, a tilt pivot assembly 400 and a drive connecting link 500 that connects the tilt drive assembly 300 to the tilt pivot assembly 400. As will be described below, when the drive assembly 300 is activated, the tilt pivot assembly 400 rotates thereby causing the seat frame assembly 104 to pivot with respect to the base assembly 102 thereby raising a front portion 118 of the seat frame assembly 104. The seat tilt control mechanism 200 is configured to provide a smooth controlled pivoting movement of the seat assembly 100. In addition, the seat tilt control mechanism 200 allows for an infinite adjustment within a range and a one-to-one correlation between adjustment of the mechanism 200 and movement of seat assembly 100.

Referring to FIGS. 3-6, FIG. 3 is an exploded view of the tilt drive assembly 300. As shown in FIGS. 1 and 2, the tilt drive assembly 300 attaches to one of the side frame members 110 (the right side frame member for the driver seat and the left side frame member for the passenger seat) of the lower support portion 106. The tilt drive assembly 300 includes several components including a mounting plate 302, an output plate 304 disposed on one side of the mounting plate 302, a drive disk 306, a drive plate 308 disposed on an opposite side of the mounting plate 302, and a lever or handle 310 attached to the drive plate 308.

Figure 3:
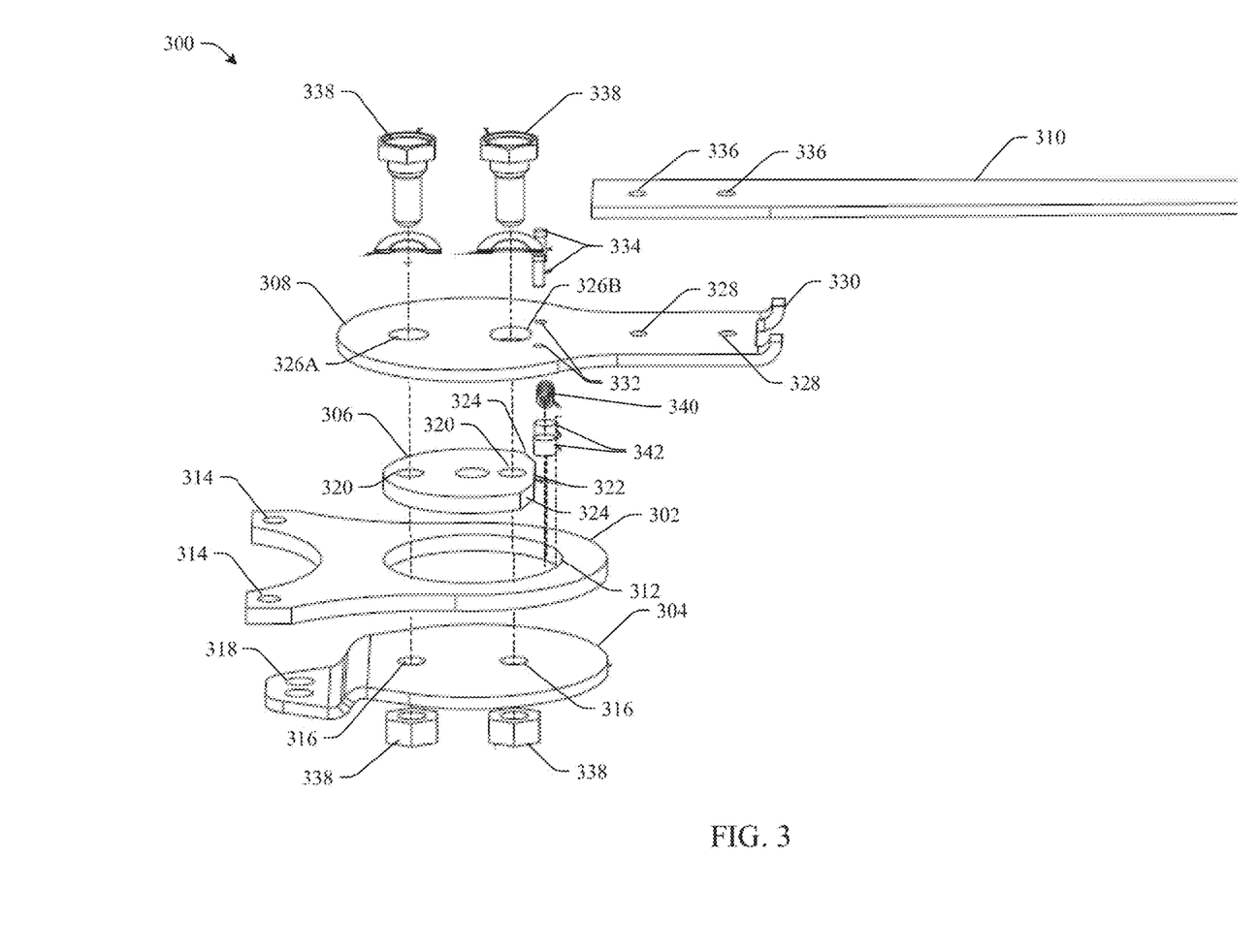
FIG. 3 is an exploded view the tilt drive assembly in accordance with the innovation.

The mounting plate 302 includes a large aperture 312 configured to receive the drive disk 306 and other components described further below that facilitate the sprag type operation of the tilt drive assembly 300. The mounting plate 302 further includes mounting holes 314 configured to receive fasteners that attach the mounting plate 302, and ultimately the tilt drive assembly 300, to one of the side frame members 110 of the lower support portion 106 as mentioned above.

As mentioned above, the output plate 304 is disposed on one side of the mounting plate 302 and includes assembly apertures 316 and at least one link aperture 318. The link apertures 318 are adapted to receive fasteners that connects the output plate 304 to the drive connecting link 500.

As mentioned above, the drive disk 306 is disposed inside the large aperture 312 of the mounting plate 302 (see FIG. 6) and includes assembly apertures 320. The drive disk 306 is substantially circular but includes a first flat surface 322 and a pair of second flat surfaces 324 that are angled with respect to the first flat surface 322. Thus, the drive disk does not occupy the entire large aperture 312 of the mounting plate 302. As will be described further below, this configuration allows for the inclusion of additional components in the drive assembly 300 that allows the tilt control mechanism 200 to operate in a similar fashion as the sprag type clutch mentioned above.

The drive plate 308 is disposed on a side of the mounting plate 302 opposite that of the output plate 304 and also includes assembly apertures, specifically, a circular assembly aperture 326A and an oval shaped aperture 326B. The drive plate 308 further includes lever attachment apertures 328 and curved alignment apertures 330 that facilitate the alignment and containment of the lever 310 when the lever 310 is attached to the drive plate 308. Still further, pin apertures 332 are defined in the drive plate 308 between the oval assembly aperture 326B and the lever attachment apertures 328. Each pin aperture 332 receives a pin 334 that extends through the pin aperture 332 and into the large aperture 312 defined in the mounting plate 302, as will be illustrated further below.

Figure 12:
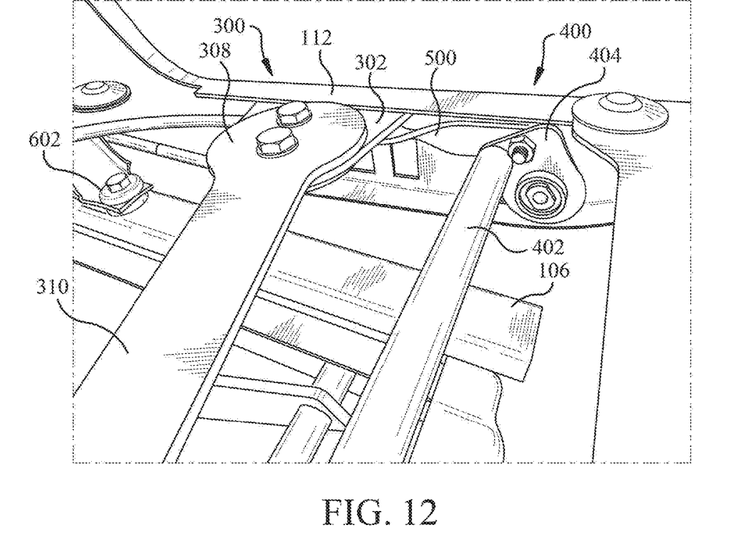
FIGS. 12-15 are perspective views of the seat assembly illustrating the operation of the tilt seat control mechanism in accordance with an aspect of the innovation.
Figure 13:
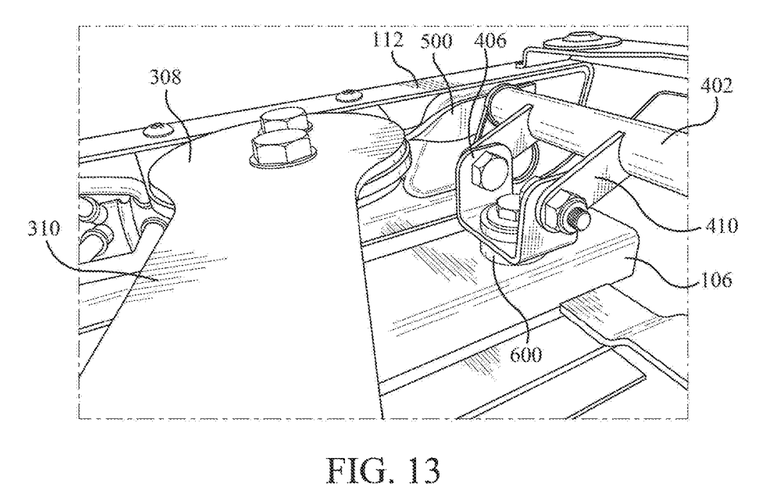

The lever 310 facilitates movement of drive assembly 300 and includes lever attachment apertures 336 that align with the lever attachment apertures 326A, 326B on the drive plate 308. The lever 310 is disposed between the curved alignment apertures 328 when attached to the drive plate 308. Fasteners are provided that extend through both the lever attachment apertures 326A, 326B, 332 on the drive plate 308 and the lever 310 respectively. It is to be understood that the drive plate 308 and the lever 310 can be combined into a single piece, as shown in FIGS. 12 and 13.

Figure 4:
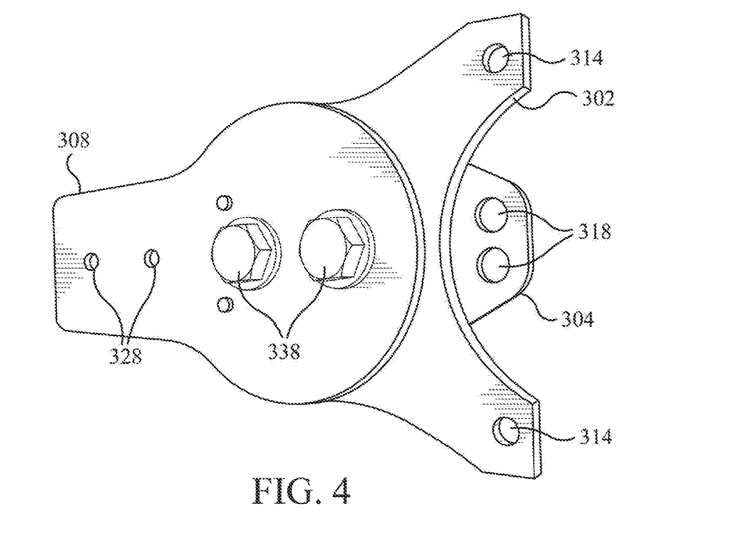
FIG. 4 is a view from one side of the tilt drive assembly in accordance with the innovation.
Figure 5:
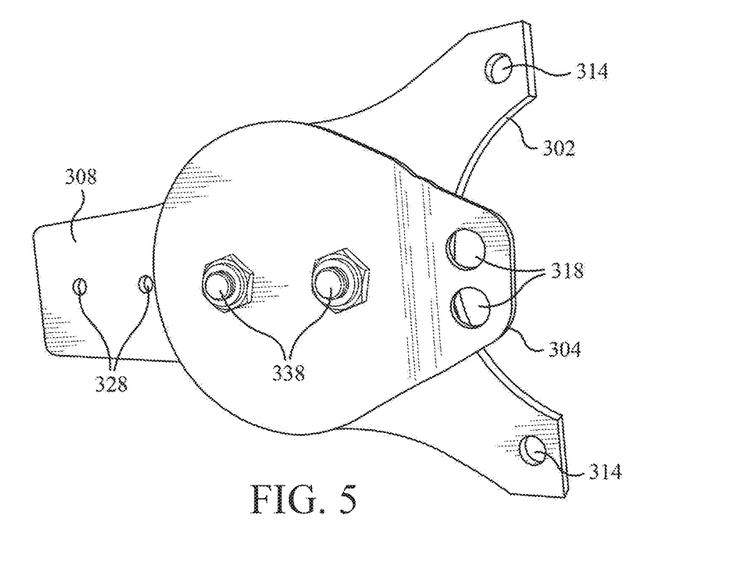
FIG. 5 is a view from an opposite side of the tilt drive assembly in accordance with the innovation.
Figure 6:
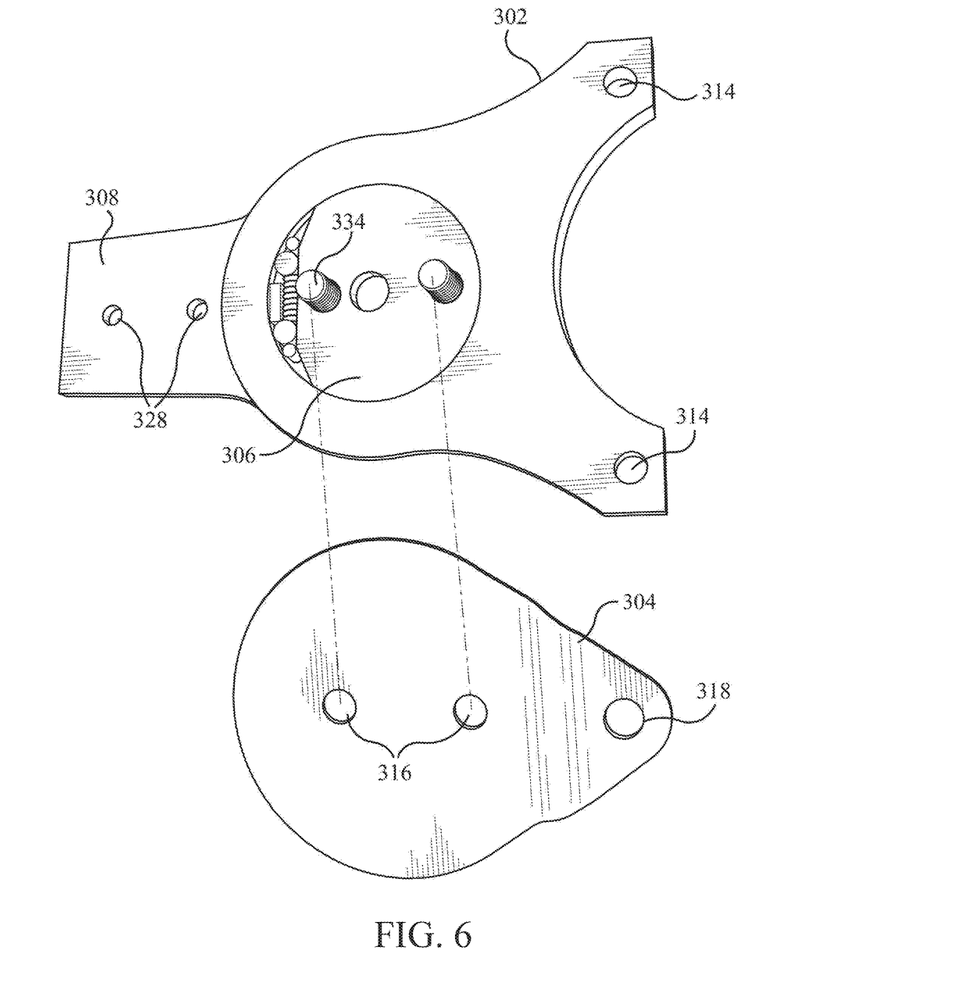
FIG. 6 is a view from the opposite side of the tilt drive assembly with an output plate removed in accordance with the innovation.

Fasteners 338 (e.g., screws, nut, hots, etc.), shown in FIG. 3-5, are provided that extend through all the assembly apertures 316, 320, 326A, 326B, that assemble and secure the mounting plate 302, the output plate 304, the drive disk 306, and the drive plate 308 along with the lever 310 together.

Figure 7:
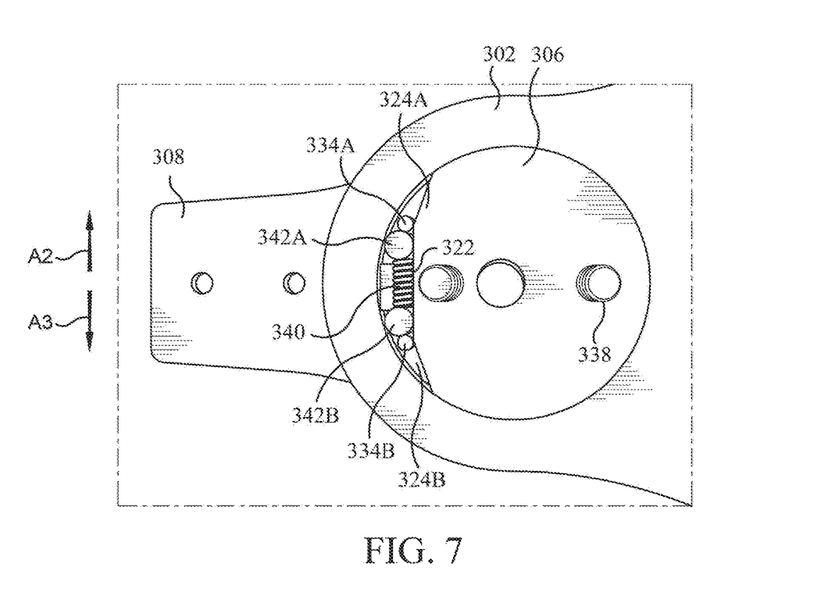
FIG. 7 is a close-up view from the opposite side of the tilt drive assembly with the output plate removed in accordance with the innovation.
Figure 8:
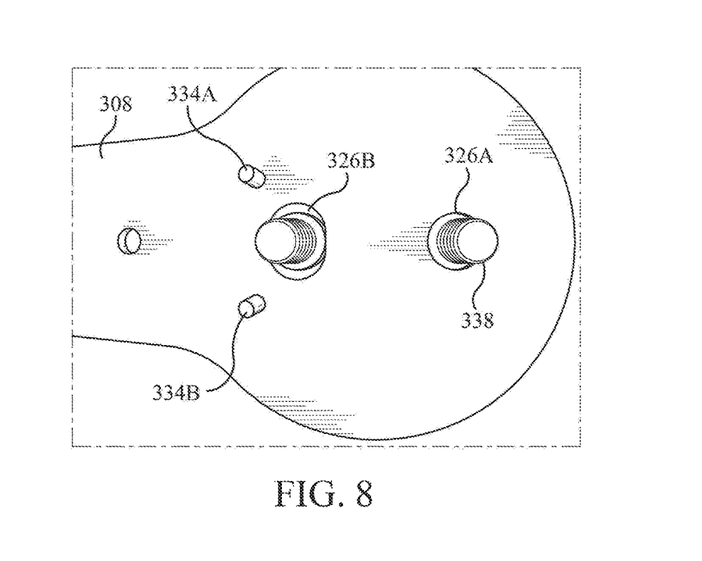
FIG. 8 is a close-up view from the opposite side of the tilt drive assembly with the output plate and a drive disc removed in accordance with the innovation.

Referring to FIGS. 7-8 and also back to FIG. 3, the tilt drive assembly 300 further includes a spring 340 and a pair of free-floating wedge rollers 342, one each disposed on each side of the spring. This is best shown in FIG. 7, where FIG. 7 is a close-up view of the tilt drive assembly 300 with the output plate 304 removed. Thus, FIG. 7 illustrates the location of the drive disc 306, the pins 334, the spring 340 and the pair of wedge rollers 342 disposed inside the large aperture 312 of the mounting plate 302. FIG. 8 is a close-up view of the drive plate 308 with the mounting plate 302, the drive disc 306, the spring 340 and the pair of wedge rollers 342 removed, thus, exposing the circular and oval assembly apertures 326A, 326B.

Figure 9:
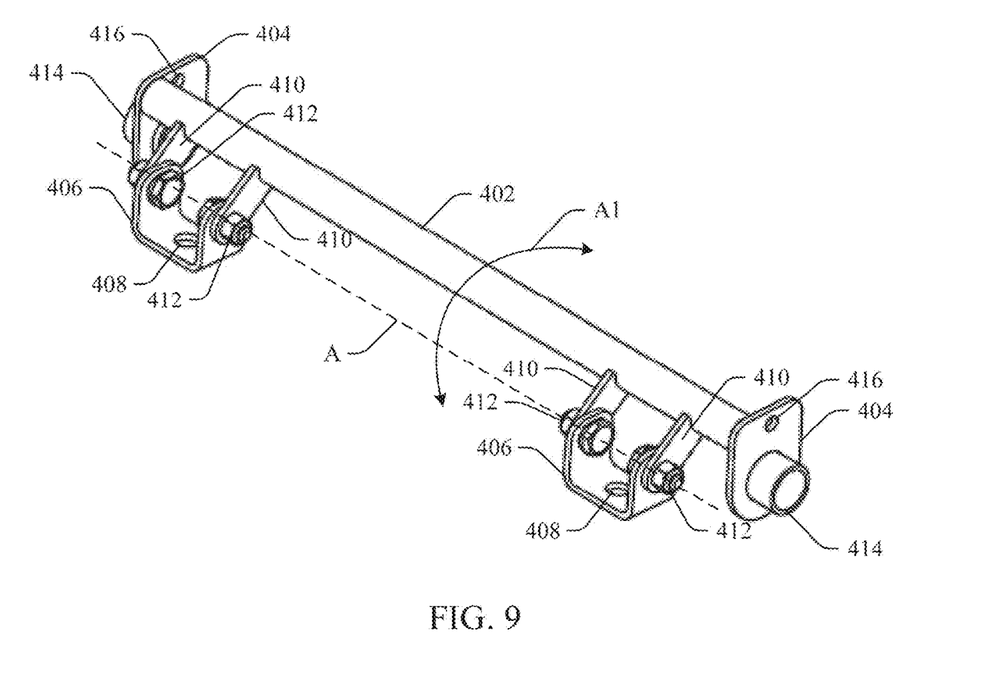
FIG. 9 is a perspective view of a tilt pivot assembly in accordance with an aspect of the innovation.

FIG. 9 is a perspective illustration of the tilt pivot assembly 400 that attaches to the side rails 106 of the base assembly 102 and pivotally attaches to each side frame member 112 of the lower support portion 108. The tilt pivot assembly 400 includes a cross member 402, a plate 404 attached to each end of the cross member 402, and a pair of U-shaped brackets 406 having an attachment aperture 408 defined therein that attach the tilt pivot assembly 400 to the side rails 106 with fasteners via the attachment apertures. Cross member arms 410 extend substantially perpendicular outward from the cross member 402 and pivotally attach the cross member 402 to the U-shaped brackets 406 via bracket fasteners 412. Thus, the cross member 402 pivots about an axis "A" defined by the bracket fasteners 412 as indicated by the arrow A1 with respect to the U-shaped brackets 406. Tube portions 414 extend substantially perpendicular outward from each plate 404 and rotatably attach to an inside surface of each side frame member 112 of the lower support portion 108 via a bearing. Each plate 404 further includes a link aperture 416 defined therein that receives a fastener to connect the drive connecting link 500 to the tilt pivot assembly 400.

Figure 10:
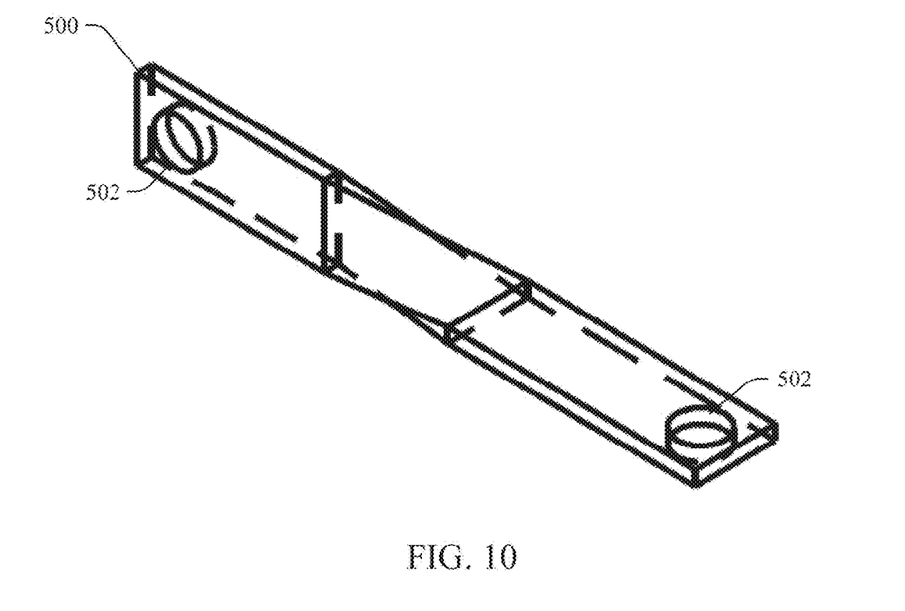
FIG. 10 is a perspective view of a drive connecting link in accordance with an aspect of the innovation.
Figure 11:
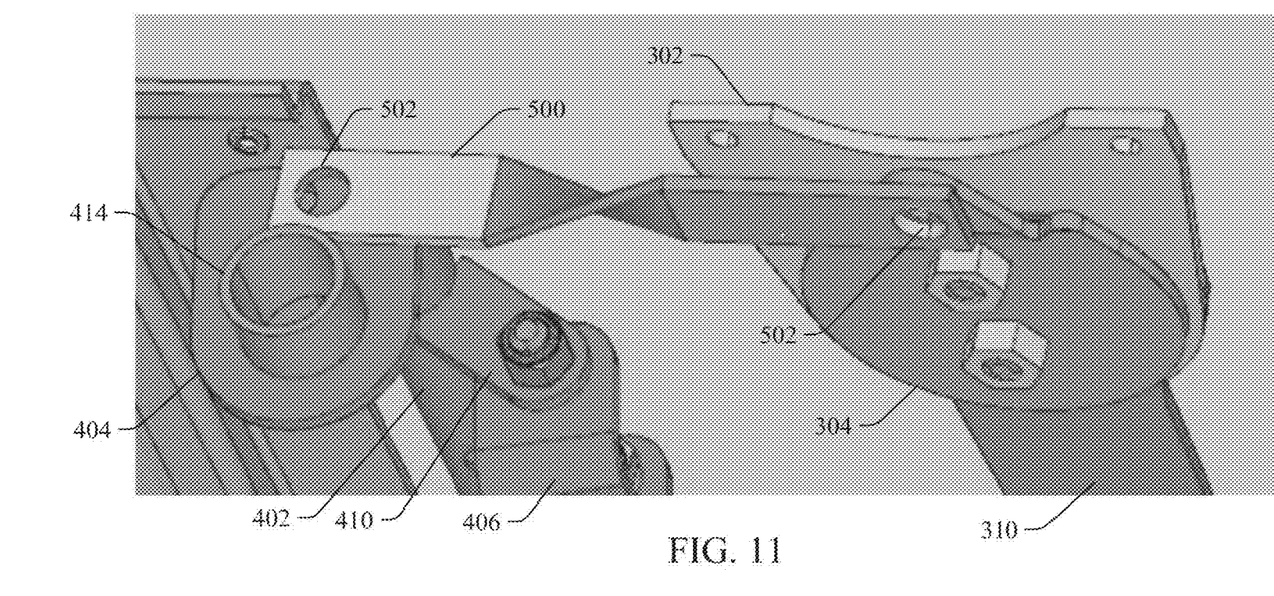
FIG. 11 is a side perspective view illustrating the connection of the drive connecting link to the tilt drive assembly and the tilt pivot assembly in accordance with an aspect of the innovation.

FIG. 10 is an illustration of the drive connecting link 500 that connects the tilt drive assembly 300 to the tilt pivot assembly 400. The drive connecting link 500 includes connecting apertures 502 defined in each end of the drive connecting link 500. One connecting aperture 502 connects to the drive assembly 300 via the link aperture 318 defined in the output plate 304 and the opposite connecting aperture 502 connects to the tilt pivot assembly 400 via the link aperture 416 defined in the plate 404 of the tilt pivot assembly 400, as shown in FIG. 11.

Referring to FIGS. 12-15, a front rubber grommet 600 is disposed toward the front of the base assembly 102 between each side rail 106 and each U-shaped bracket 406 to provide a cushioned support and facilitate the pivoting motion of the tilt drive assembly 400. A rear rubber grommet 602 is disposed toward a rear of the base assembly 102 between each side rail 106 and each U-shaped bracket 406 to provide a cushioned support and facilitate the pivoting motion of the tilt drive assembly 400, as will be subsequently described.

Figure 14:
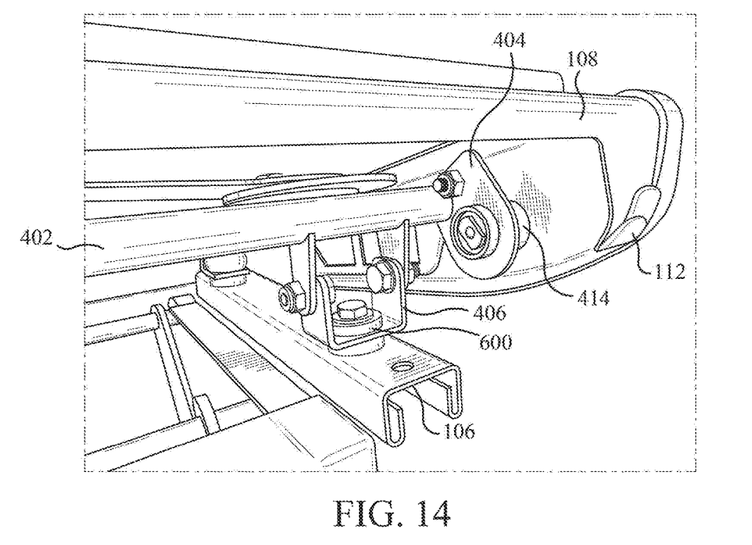
Figure 15:
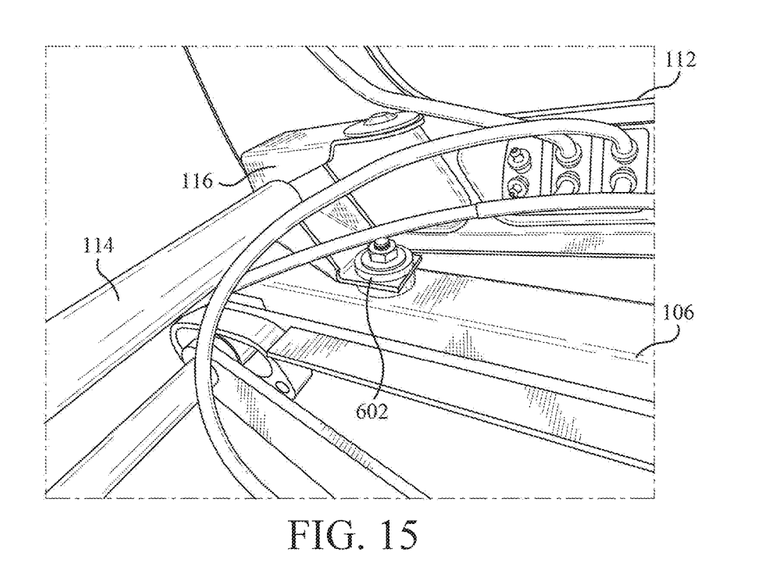
Figure 16A:
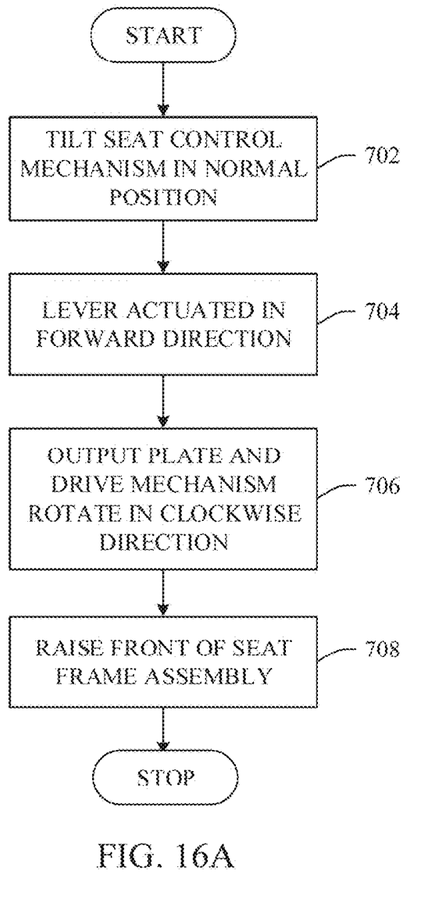
FIGS. 16A and 16B are block diagram illustrations illustrating a method of adjusting a seat assembly in accordance with an aspect of the innovation.
Figure 16B:
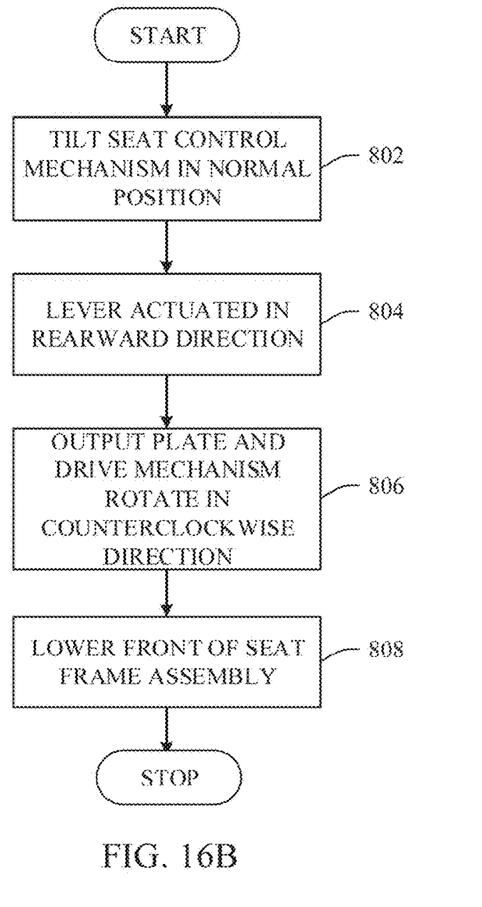

Referring to FIGS. 12-15, FIG. 16A, and also back to FIG. 1, operation of the seat tilt control mechanism 200 relating to raising the seat frame assembly 104 will now be described. At 702, FIG. 1 shows the tilt seat control mechanism 200 in a normal neutral un-tilted position. Specifically, the lever 310 of the tilt drive assembly 300 is neither in a forward or rearward direction and is substantially perpendicular to the side frame members 112. At 704, the lever 310 is actuated (e.g., moved or pivoted) in a forward direction. At 706, the output plate 304 and the drive disc 306 rotate in a clockwise direction (the mounting plate 302 remains stationary) and at 708, the front of the seat frame assembly 104 raises with respect to the base assembly 102 (FIGS. 12 and 14). Specifically, the seat frame assembly 104 pivots with respect to the base assembly 102 about a point defined by the location of the rear rubber grommets 602, see FIG. 15.

Similarly, referring to FIGS. 12-15, FIG. 16B, and to FIG. 1, the operation of the seat tilt control mechanism 200 relating to lowering the seat frame assembly 104 will now be described. At 802, FIG. 1 shows the tilt seat control mechanism 200 in the normal or neutral un-tilted position. At 804, the lever 310 is actuated (e.g., moved or pivoted) in a rearward direction. At 806, the output plate 304 and the drive disc 306 rotate in a counterclockwise direction (the mounting plate 302 remains stationary) and at 808, the front of the seat frame assembly 104 lowers with respect to the base assembly 102 (FIG. 13). Specifically, the seat frame assembly 104 pivots with respect to the base assembly 102 about a point defined by the location of the rear rubber grommets 602, see FIG. 15. It is to be understood, that the tilt seat control mechanism can be arranged such that forward movement of the lever 310 lowers the front of the seat frame assembly 104 and rearward movement of the lever 310 raises the seat frame assembly 104.

Still referring to FIGS. 12-15 and now to FIGS. 7-8, specific operation of the tilt drive assembly 200 and the tilt pivot assembly 300 relating to the raising and lowering of the seat frame assembly 104 with respect to the base assembly 102 will now be described. When the lever 310 is in the normal position described above, the wedge rollers 342A, 342B are disposed against the first flat surface 322 and the spring 340 pushes each wedge roller 342A, 342B away from each other toward each pin 334 and essentially traps the wedge rollers 342A, 342B. The wedge rollers 342A, 342B prevent the drive disc from rotating, thus, locking the drive disc 306 and ultimately, the tilt drive assembly 300 in the normal position.

In order to rotate the lever 310 and adjust the tilt on the seat frame assembly 104, one of the wedge rollers 342A, 342B must be unseated. The oval shaped aperture 326B on the drive plate 308 facilitates the unseating of the wedge roller 342A or 342B, which prevents motion in the desired direction. Specifically, the oval shaped aperture 326B permits a small rotation of the lever 310 without rotation of the drive disc 306. Thus, the pins 334A, 334B rotate slightly with respect to both the drive disc 306 and wedge rollers 342A, 342B, thereby unseating the wedge roller preventing motion in the desired direction, thus, freeing up the drive disc 306 when the lever 310 is further rotated.

As a result, when the lever 310 is rotated, the output plate 304 and the drive disc 306 also rotate, but the mounting plate 302 remains stationary. Upon rotation of the lever 310 in a first direction indicated by the arrow A2, the drive disc 306 rotates such that wedge roller 342B is now disposed against the second flat surface 324B and the front portion 118 of the seat frame assembly 104 is now adjusted (e.g., either raised or lowered) via the drive connecting link 500 and the tilt pivot assembly 400 explained below. The wedge roller 342B prevents rotation of the drive disc 306 back in the opposite direction thereby locking the tilt seat mechanism 300 and the seat frame assembly 104 in place. Further rotation of the lever 310, however, causes the pin 334B to disengage the wedge roller 342B and release the drive disc 306 thereby allowing the an opposite rotation of the lever 310 and the drive disc 306, thus returning the seat frame assembly 104 to the normal position.

Similarly, upon rotation of the lever 310 in a second direction indicated by the arrow A3, the drive disc 306 rotates such that wedge roller 342A is now disposed against the second flat surface 324A and the front portion 118 of the seat frame assembly 104 is now adjusted (e.g., either raised or lowered) via the drive connecting link 500 and the tilt pivot assembly 400 explained below. The wedge roller 342A prevents rotation of the drive disc 306 back in the opposite direction thereby locking the tilt seat mechanism 300 and the seat frame assembly 104 in place. Further rotation of the lever 310, however, causes the pin 334A to disengage the wedge roller 342A and release the drive disc 306 thereby allowing the an opposite rotation of the lever 310 and the drive disc 306, thus returning the seat frame assembly to the normal position.

Rotation of the tilt drive assembly 200 in either direction causes the drive connecting link 500 to move in either a forward or rearward direction. This in turn causes the tilt pivot assembly 400 to pivot about the axis A mentioned above in either a forward or rearward direction respectively or in a rearward or forward direction respectively, thus, causing the front of the seat frame assembly 104 to raise or lower respectively or lower and raise respectively with respect to the base assembly 102.

As mentioned above, one advantage to the innovative tilt seat control mechanism is that the position of the lever has a one-to-one correspondence with the tilt position of the seat. Thus, the position of the lever gives a true indication of the position of the seat.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A seat tilt control mechanism for a vehicle comprising:
    a tilt drive assembly attached to a seat frame assembly;
    a tilt pivot assembly attached to the seat frame assembly and a base assembly, the tilt pivot assembly including a cross member, a plate attached to each end of the cross member, a pair of U-shaped brackets having an attachment aperture defined therein that attaches the tilt pivot assembly to a pair of side rails of the base assembly, wherein the cross member includes cross member arms that extend substantially perpendicular outward from the cross member and pivotally attach the cross member to the brackets; and
    a drive link connecting the tilt drive assembly to the tilt pivot assembly,
    wherein actuation of the tilt drive assembly adjusts a tilt position of the seat frame assembly with respect to the base assembly.

2. The seat tilt control mechanism of claim 1, wherein the tilt pivot assembly attaches to the side rails of the base assembly and pivotally attaches to a pair of side frame members of the base assembly.

3. The seat tilt control mechanism of claim 1, wherein the cross member is pivotally attached to the U-shaped brackets via bracket fasteners.

4. The seat tilt control mechanism of claim 1, wherein each plate includes tube portions that extend substantially perpendicular outward and rotatably attach to an inside surface of each side frame member.

5. The seat tilt control mechanism of claim 4, wherein each plate further includes a link aperture defined therein that receives a fastener to connect the drive link to the tilt pivot assembly.

6. The seat tilt control mechanism of claim 1, wherein the tilt drive assembly includes a mounting plate, a drive disc disposed inside an aperture in the mounting plate, a drive plate disposed on an opposite side of the mounting plate, and a lever attached to the drive plate.

7. The seat tilt control mechanism of claim 6, wherein the tilt drive assembly further includes a spring disposed inside the aperture of the mounting plate and a pair of wedge rollers disposed inside the aperture on opposite sides of the spring.

8. The seat tilt control mechanism of claim 6, wherein actuation of the tilt drive assembly causes a rotation of the tilt pivot assembly and adjusts a height of a front of the seat frame with respect to the base assembly.

9. The seat tilt control mechanism of claim 8, wherein actuation of the lever in a forward direction pivots the seat frame assembly about a point such that a front of the seat frame raises with respect to the base assembly.

10. The seat tilt control mechanism of claim 8, wherein actuation of the lever in a rearward direction pivots the seat frame assembly about a point such that a front of the seat frame lowers with respect to the base assembly.

11. A vehicle seat assembly comprising:
    a base assembly that attaches to an interior floor surface of a vehicle, the base assembly including a pair of side rails, each disposed on each side of the base assembly;
    a seat frame assembly attached to the base assembly; and
    a seat tilt control mechanism attached to the base assembly and the seat frame assembly,
        wherein the seat tilt control mechanism includes a tilt drive assembly attached to the seat frame assembly, a tilt pivot assembly attached to the base assembly and the seat frame assembly, and a drive link connecting the tilt drive assembly to the tilt pivot assembly,
        wherein actuation of the seat tilt control mechanism adjusts a tilt position of the seat frame assembly with respect to the base assembly; and
        wherein the tilt pivot assembly includes a cross member, a plate attached to each end of the cross member, a pair of U-shaped brackets having an attachment aperture defined therein that attach the tilt pivot assembly to the side rails of the base assembly, wherein the cross member includes cross member arms that extend substantially perpendicular outward from the cross member and pivotally attach the cross member to the brackets.

12. The vehicle seat assembly of claim 11, wherein the base assembly includes an upper support portion and a lower support portion, the lower support portion including a pair of side frame members, and wherein the tilt pivot assembly attaches to the side rails of the base assembly and pivotally attaches to each side frame member.

13. The vehicle seat assembly of claim 11, wherein the tilt drive assembly includes a mounting plate, a drive disc disposed inside an aperture in the mounting plate, a drive plate disposed on an opposite side of the mounting plate, and a lever attached to the drive plate.

14. The vehicle seat assembly of claim 13, wherein the tilt drive assembly further includes a spring disposed inside the aperture of the of the mounting plate and a pair of wedge rollers disposed inside the aperture on opposite sides of the spring.

15. The vehicle seat assembly of claim 14, wherein the drive disc includes a first flat surface and a pair of second flat surfaces on either side of the first flat surface and at an angle with respect to the first flat surface and wherein when the pair of wedge rollers are disposed against the first flat surface, the seat tilt control mechanism is in a locked position.

16. The vehicle seat assembly of claim 15, wherein rotation of the lever causes one of the wedge rollers to unseat thereby allowing rotation of the drive disc and the output plate to thereby permit rotation of the tilt pivot assembly to adjust a height of the front of the seat frame assembly with respect to the base assembly.

17. The vehicle seat assembly of claim 13, wherein actuation of the tilt drive assembly causes a rotation of the tilt pivot assembly and adjusts a height of a front of the seat frame assembly with respect to the base assembly.

18. The vehicle seat assembly of claim 17, wherein actuation of the lever in a forward direction pivots the seat frame assembly about a point such that a front of the seat frame assembly raises with respect to the base assembly.

19. The vehicle seat assembly of claim 17, wherein actuation of the lever in a rearward direction pivots the seat frame assembly about a point such that a front of the seat frame assembly lowers with respect to the base assembly.

\* \* \* \* \*